United States Patent
Benson et al.

(10) Patent No.: US 6,898,585 B2
(45) Date of Patent: May 24, 2005

(54) FUZZY LOGIC METHOD FOR ADAPTIVELY EVALUATING THE VALIDITY OF SENSOR DATA

(75) Inventors: Eric R. Benson, Urbana, IL (US); Qin Zhang, Champaign, IL (US); John F. Reid, Champaign, IL (US)

(73) Assignee: University of Illinois, Urbana, IL (US)

( * ) Notice: Subject to any disclaimer, the term of this patent is extended or adjusted under 35 U.S.C. 154(b) by 690 days.

(21) Appl. No.: 09/775,896

(22) Filed: Feb. 2, 2001

(65) Prior Publication Data

US 2002/0105428 A1 Aug. 8, 2002

(51) Int. Cl.[7] .............................................. G06F 9/44
(52) U.S. Cl. ........................ 706/52; 706/1; 706/2; 706/3; 706/4; 706/5; 706/6; 706/7; 706/8; 706/9; 706/14; 706/45; 700/50; 700/52; 700/54
(58) Field of Search ........................... 706/1–9, 14, 45, 706/52; 700/50, 52, 54, 28

(56) References Cited

U.S. PATENT DOCUMENTS

| | | | | |
|---|---|---|---|---|
| 5,371,695 A | * | 12/1994 | Baraszu | 708/322 |
| 5,526,467 A | * | 6/1996 | Ejima et al. | 706/52 |
| 5,623,929 A | * | 4/1997 | Weng | 600/455 |
| 5,751,862 A | * | 5/1998 | Williams et al. | 382/260 |
| 5,758,025 A | * | 5/1998 | Wu | 706/3 |
| 5,764,854 A | * | 6/1998 | Ota et al. | 706/8 |
| 5,822,740 A | * | 10/1998 | Haissig et al. | 706/3 |
| 5,897,672 A | * | 4/1999 | Badami et al. | 8/159 |
| 5,905,978 A | * | 5/1999 | Smith et al. | 706/52 |
| 6,047,220 A | * | 4/2000 | Eryurek | 700/28 |
| 6,205,439 B1 | * | 3/2001 | Gardner | 706/7 |
| 6,430,544 B1 | * | 8/2002 | Childress | 706/1 |
| 6,473,708 B1 | * | 10/2002 | Watkins et al. | 702/130 |

OTHER PUBLICATIONS

PhaniShankar, C.V., Fuzzy Rules for Automated Sensor Self–Validation and Confidence Measure, Jun. 28, 2000, Proceedings of the 2000 American Control Conference, vol. 6, p. 2912–16.*

* cited by examiner

*Primary Examiner*—Anthony Knight
*Assistant Examiner*—Ronald D Hartman, Jr.
(74) *Attorney, Agent, or Firm*—John William Stader; Collin A. Webb

(57) ABSTRACT

Machine operators rely on intuition and experience to evaluate vehicle performance. As we increasingly turn to automation, it is important to automatically evaluate sensor data and system performance. Fuzzy logic allows us to take advantage of domain knowledge to evaluate data and to describe a system linguistically. In this application a fuzzy quality module evaluates output from a noisy sensor. It compares the sensor data with an estimated sensor value, and based on that comparison, dynamically adapts a fuzzy logic rulebase used to determine whether the sensor value is valid or not.

14 Claims, 8 Drawing Sheets

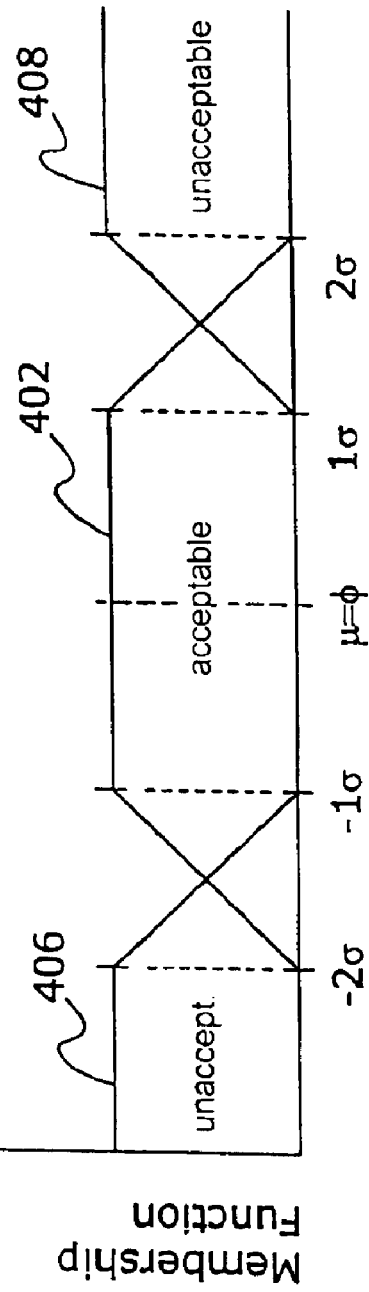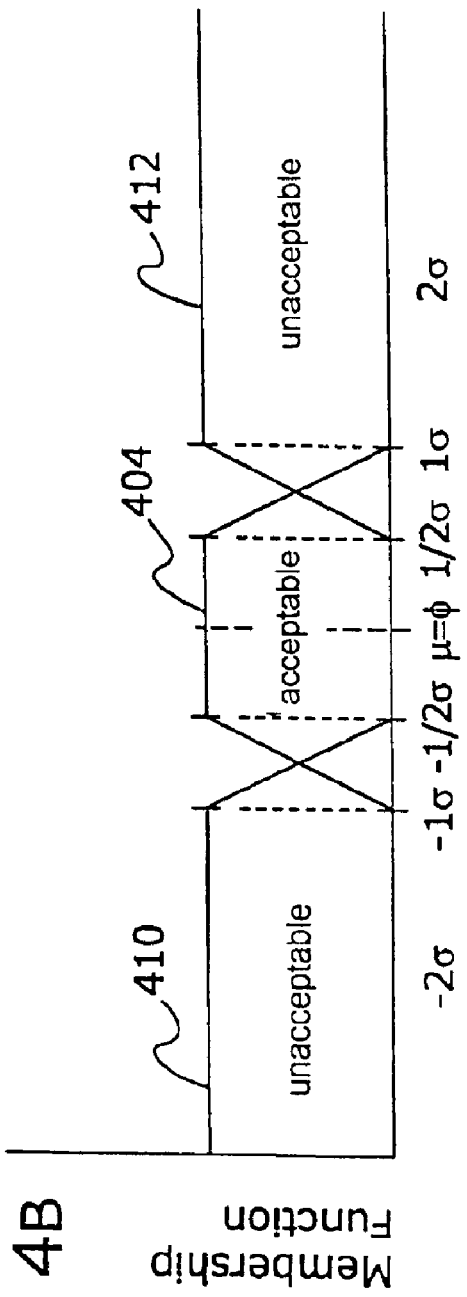
Figure 4A
Figure 4B

FIGURE 7

| Trial | Acceptance | | |
|---|---|---|---|
| | Manual $1C_1\sigma$ | $2C_1\sigma$ | Fuzzy |
| Wide Trial 1 | 288 | 494 | 443 |
| Wide Trial 2 | 323 | 484 | 447 |
| Wide Trial 3 | 323 | 488 | 450 |
| Wide Trial 4 | 381 | 496 | 488 |
| Wide Trial 5 | 284 | 488 | 436 |
| Wide Sum | 1599 | 2450 | 2264 |
| Narrow Trial 1 | 167 | 321 | 222 |
| Narrow Trial 2 | 174 | 275 | 198 |
| Narrow Trial 3 | 171 | 290 | 193 |
| Narrow Trial 4 | 187 | 314 | 216 |
| Narrow Trial 5 | 166 | 309 | 220 |
| Narrow Sum | 865 | 1509 | 1049 |
| Total | 2464 | 3859 | 3313 |

FIGURE 8

| Trial | $1C_1\sigma$ FALSE | TRUE | % Correct | $2C_1\sigma$ FALSE | TRUE | % Correct |
|---|---|---|---|---|---|---|
| Wide Trial 1 | 155 | 344 | 68.94 | 51 | 448 | 89.78 |
| Wide Trial 2 | 124 | 375 | 75.15 | 37 | 462 | 92.59 |
| Wide Trial 3 | 127 | 372 | 74.55 | 38 | 461 | 92.38 |
| Wide Trial 4 | 107 | 392 | 78.56 | 8 | 491 | 98.40 |
| Wide Trial 5 | 152 | 347 | 69.54 | 52 | 447 | 89.57 |
| Wide Sum | 665 | 183. | 73.35 | 186 | 2309 | 92.5 |
| Narrow Trial 1 | 55 | 444 | 88.98 | 99 | 400 | 80.16 |
| Narrow Trial 2 | 24 | 475 | 95.19 | 77 | 422 | 84.57 |
| Narrow Trial 3 | 22 | 477 | 95.59 | 97 | 402 | 82.56 |
| Narrow Trial 4 | 29 | 476 | 94.19 | 98 | 401 | 86.36 |
| Narrow Trial 5 | 54 | 445 | 89.63 | 89 | 410 | 82.16 |
| Narrow Sum | 184 | 2311 | 92.63 | 460 | 2035 | 81.56 |
| Total | 849 | 4141 | 82.98 | 646 | 4344 | 87.05 |

FUZZY LOGIC METHOD FOR ADAPTIVELY EVALUATING THE VALIDITY OF SENSOR DATA

BACKGROUND OF THE INVENTION

Fuzzy logic has been applied to many different types of problems since introduced by Zadeh in 1965. Unlike Boolean logic, fuzzy logic is suited to evaluating subjective situations. For agriculture, the subjectivity of fuzzy logic is particularly appealing (Ribeiro, 1999, Wang, 1996, Zhang and Litchfield, 1991, 1994). Field conditions—weather, the position and intensity of the sun and dust, just to name a few—and crop conditions—size, shape, weed and pest pressure—combine to create a difficult situation for conventional evaluation methods. For example, given a pile of fruit, we can separate apples and oranges. If we are looking at a Jonamac apple, our description might include red, a hint of green and a mostly round shape. If we look at a Granny Smith apple, the description might include green, smooth and oblong. An orange might have an orange color, a rough texture and round as descriptors. While we can verbally describe apples and oranges, it's much more difficult to create a mathematical description of an apple or orange that will apply for all situations. The variability common in agriculture makes fuzzy logic appealing. Fuzzy logic is based on set theory. In Boolean set theory, a value either is or is not a member of a set. In fuzzy logic, the member can be partially a member of a set. For example, a Granny Smith apple is partially round. The apple might have a value of $\mu_{GS}(x)$ round and $(1-\mu_{GS}(x))$ not round. Each element—or in this case, fruit in the pile—is evaluated independently based on a set of membership functions. The membership functions are used to describe the classes in question. The membership functions stem from the linguistic classes used to describe the items. The number of membership classes and the membership functions within the class will vary with the situation. In the fruit example, membership classes might include roundness, a color index and surface texture. Within the roundness class, there may be two functions (round/not round) while other classes (color index) may require more functions to adequately describe the situation. With Boolean logic, an element is either a member of the class (1) or it is not (0). With fuzzy logic, an element can partially belong to multiple classes. For any two fizzy sets (S1 and S2), three basic operations can be defined.

Intersection $$\mu_{S1 \cap S2} = \min\{\mu_{S1}(u), \mu_{S2}(u)\}$$

Union $$\mu_{S1 \cap S2} = \max\{\mu_{S1}(u), \mu_{S2}(u)\}$$

Complement $$\mu_{S1} = 1 - \mu_{S1}$$

In machine vision, variability in the target and scene make fuzzy logic attractive. Machine vision is one of the primary sensors for an ongoing agricultural vehicle guidance project at the University of Illinois at Urbana—Champaign. Sensors have included machine vision, GPS, and a variety of heading sensors (Stombaugh, et al., 1998, Benson, et al., 1998, Noguchi, et al., 1998).

Sensor fusion—specifically Kalman filtering—has played an important role in the project. With an extended Kalman filter, an estimator calculates the expected states of the vehicle based on the most recent state information. An observer evaluates the sensor output and it is validated against the estimated output. A large difference between the expected and actual sensor value is indicative of a problem with the sensor or sensor processing (Hague and Tillett, 1996).

A variety of methods can be used to evaluate the output from the sensor. Noguchi, et al., (1998) described a probability density approach, in which the sensor variability was characterized a priori. A predetermined probability, however, cannot account for situational variations. An adaptive, or "on-the-fly" system, can account for changes in the scene.

An adaptive system uses flexible parameters to evaluate the sensor output. The nature of the evaluation parameter depends on the system. An internally referenced parameter, for example standard deviation of the output, can be used to detect significant outliers. An example of an adaptive evaluation system is presented in this application. An externally referenced parameter could be tied to another sensor. An example would be comparing the heading from a fiber optic gyro to the heading from a time series of GPS positions to determine whether the fiber optic gyro signals were indeed valid. In a system like this, the heading from the fiber optic gyro would provide the raw sensor data, and the time series would be the estimated sensor data, as those terms are used below.

In contrast, a fixed membership function cannot account for variability. In agriculture, weather, weeds and other field conditions can cause changes in sensor output. A fixed threshold is harshly optimistic (actual sensor output never meets the actual conditions), too generous (the system never encounters a unacceptable value), or somewhere in-between. In this application, a generic fuzzy quality analysis module is presented. The module was developed and used to evaluate simulated sensor data.

Ideally, sensors should always produce high quality, repeatable measurements. Unfortunately, real world variations can cause sensor errors. With only a single sensor, it can be difficult to tell when there is a problem with the sensor. With multiple sensors, we can begin to compare the results between sensors and determine when there is an error. The question can still remain—which sensor is "right" and which is "wrong". What is needed is an improved method for determining whether a sensor signal is right or wrong. A sensor may not provide a signal that truly indicates a sensed parameter for many reasons. For example, the sensor or its associated circuitry may be broken. The sensor and its circuitry may not be broken, but the sensor may have been moved away from the environment it should be sensing to another environment, such as a temperature sensor that has been pulled out of its environment, or a camera that has been bumped away from its proper field of view. A sensor may be in the proper location, but may be fouled with environmental matter such as stray leaves that fly in front of a camera or an oxygen sensor in a car that has become carbon fouled.

What is needed is a method for determining whether the signal provided by a sensor is valid. It is an object of the application to provide such a method.

SUMMARY OF THE INVENTION

In accordance with a first embodiment of the invention, a method for determining the validity of a sensor signal is provided, including the steps of providing a sensor signal from a sensor, providing an estimated sensor signal, determining the difference between the sensor signal and the estimated sensor signal, calculating the standard deviation of the difference, scaling the points of inflection of a fuzzy logic membership function proportional to the standard deviation, and processing the sensor signal using the fuzzy logic membership function to determine whether the sensor signal is valid or not.

The step of processing may occur before the step of scaling or the step of scaling may occur before the step of processing. The fuzzy logic membership function may have at least two domains, including at least one domain that evaluates a sensor signal as acceptable, and at least one domain that evaluates a sensor signal as unacceptable. The step of scaling may include the step of multiplying each of at least two points of inflection of the fuzzy logic membership function by the standard deviation.

In accordance with a second embodiment of the invention, a method for determining the quality of a sensor signal in a fuzzy logic controller is provided, including the steps of providing a first cumulative scatter value indicative of a cumulative degree of difference between a plurality of sensor signal values and estimated sensor signal values corresponding to each of the sensor signal values, providing a fuzzy logic membership function in which the x-axis values of the points of inflection of a plurality of fuzzy logic domains are derived from the first cumulative scatter value, retrieving a further sensor signal value, comparing the further sensor signal value with a further estimated sensor signal value, calculating a further scatter value indicative of the individual degree of difference between the further sensor signal value and the further estimated sensor signal value, combining the further scatter value with the first cumulative scatter value to provide a second cumulative scatter value indicative of the cumulative degree of difference and the individual degree of difference in combination, and revising the fuzzy logic membership function such that the x-axis values of the points of inflection of the plurality of fuzzy logic domains are derived from the second cumulative scatter value.

The step of providing a first cumulative value may include the steps of calculating a first difference between a first of the plurality of sensor signal values and a first of the estimated sensor signal values, calculating a second difference between a second of the plurality of sensor signal values and a second of the estimated sensor signal values, and calculating the first cumulative scatter value from at least the foregoing first and second differences. The first cumulative scatter value may be a function of the standard deviation of the first and second differences.

In accordance with a third embodiment of the invention, a method of individually determining whether a plurality of sequential sensor values are valid is provided, including the steps of reading a sensor value determining a degree of difference between the sensor value and an estimated sensor value revising the size and shape of a fuzzy logic membership function that is responsive to the degree of difference as an input and produces a signal indicative of the validity of the sensor value as an output determining whether the sensor value is valid, and repeating each of the foregoing steps for each of the plurality of sequential sensor values.

The method may also include the steps of calculating a value indicative of the collective degree of scatter of the individual degree of differences previously calculated. The step of calculating may be performed after each step of determining a degree of difference, and wherein the value indicative of the collective degree of scatter incorporates all of the previous individual degrees of difference. The value indicative of the collective degree of scatter may be a standard deviation of prior degrees of difference previously calculated. The x-axis values of the membership function may themselves be functions of the standard deviation. The method may also include the step of calculating a plurality of the x-axis values every time the step of calculating a value indicative of the degree of scatter occurs. Each of the x-axis values of the points of inflection may be associated with a value that is a function of the collective degree of scatter.

BRIEF DESCRIPTION OF THE DRAWINGS

The present invention will become more fully understood from the following detailed description, taken in conjunction with the accompanying drawings, wherein like reference numerals refer to like parts, in which:

FIG. 4A is an input membership function for the rulebase of FIG. 1 having a wide acceptance level;

FIG. 4B is an alternative input membership function for the rulebase of FIG. 1 having a narrow acceptance level;

FIG. 7 is table that compares the validity of the raw sensor values as compared with estimated sensor values using two methods, the fuzzy logic validity method and a manual comparison method;

FIG. 8 is a table that shows the percentage of agreement between the manual method and the fuzzy logic method by showing the percentage of datapoints for which both methods were in agreement.

DETAILED DESCRIPTION OF THE PREFERRED EMBODIMENTS

In the discussion below we explain how the method of determining the validity of a sensor signal was simulated and tested to determine is viability. This was done by using a set of data created specifically for this purpose and saved to a computer file.

To devise a system to determine whether or not a sensor signal is valid (i.e. acceptable or unacceptable) and therefore whether or not it should be used in further computer processing, the first step is to develop a general structure of such a system and determine its feasibility. In this first step we developed a generic fuzzy quality module that can evaluate sensor output. The general structure of this module is shown in FIG. 1.

Figure 1:
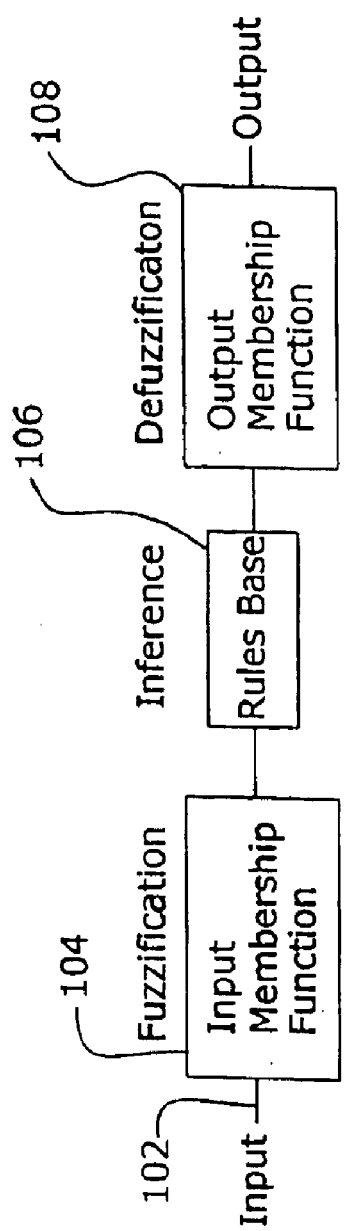
FIG. 1 is a block diagram of a theoretical fuzzy logic sensor signal validity determining circuit.

In FIG. 1, a signal whose quality or validity is to be determined is placed on input line 102. This signal is fuzzified in block 104 where it is converted into memberships in two or more fuzzy sets. A fuzzy logic inference engine then applies a plurality of rules from a rulebase to the set memberships in block 106. These rules have been empirically developed to determine whether or not the signal is valid or not. The output of the inference engine is then defuzzified in block 108 to provide a single output indicative of whether the signal is valid or not. If the signal is valid, it may then be used in further processing to automatically control some process. If not, it is discarded and is not used for process control. In the present application, the example sensor is a fiber optic gyro that provides a heading signal and the further processing is trajectory planning for automatic vehicle guidance. The specific sensor and application are merely exemplary, however, and form no part of the inventive method.

The structure shown in FIG. 1 is flexible and can be easily applied to different problems by changing the number and type of membership functions. While the system shows a single input (for convenience of illustration), several signals may be fuzzified and collectively processed by the inference engine by the addition of several more input fuzzification blocks and adding additional rules to the rulebase used by the fuzzy logic inference engine.

To increase the generality and flexibility of the fuzzy quality analysis module, the generic fuzzy module was developed to simultaneously process sensor signals from many sensors. While only a single sensor signal is shown as an input in FIG. 1, the number of signals that can be simultaneously validated is limited only by the bandwidth of the processor used to apply the fuzzy logic algorithm.

The default design used trapezoidal membership functions (FIGS. 4A and 4B). Trapezoidal membership functions were chosen to simplify coding and tuning. The membership functions were initially read from a file; C functions were developed to allow the input and/or output membership functions to be changed during execution.

Changing the membership functions during execution allows the membership functions to be adaptively tuned for optimal performance. Examples of adaptive membership functions are shown in FIGS. 4A and 4B. As the number of inputs increases, it becomes increasingly difficult to organize and manage an explicit rules base. For example, with a four input system (as shown in the machine vision example below), a four dimensional space would be required to explicitly create the rules base. For this reason, each input was evaluated independently.

The input/output relationship was established by defining a mapping from the fuzzy input function to an appropriate fuzzy output function. The mapping was of the form "fuzzy input category X" is processed with "fuzzy output category Y". Each input category was assigned a varying fitness level from 0 to 1 based on the relative position within the membership function.

Defuzzification converted the fuzzy linguistic output into a crisp output. The fitness level was used to determine the relative strength of the appropriate output membership function. A center of gravity approach was used to process the varying fitness output functions. The output from the individual inputs was summed together to create a composite output. The specific implementations of both systems are described below.

The goal was to develop and evaluate a fuzzy validation model that can be adapted for use with for many different types of sensors and signal values. For this reason, the overall structure shown in FIG. 1 does not replicate a specific system using a specific sensor type or a specific number of sensors, but rather a single fuzzy logic based validation system that can produce a single output indicating the acceptability of a sensor signal.

The intent is to show that a fuzzy logic validation technique can be applied to any arbitrary sensor. A system suitable for an arbitrary sensor can then be transferred to a specific sensor with relative ease. The simulation code, including the test signal and the fuzzy evaluation module, was written in C.

A fixed set of rules in the rulebase cannot accommodate a sensor signal that may vary over time. For example, some sensors have a significant amount of noise. As mentioned above in the Background, Kalman filtering has been used in the past to accommodate these signal values and estimate the true sensor level. Any fuzzy logic system that wishes to approach the flexibility and discriminating power of Kalman filtering must also be able to accommodate a noisy signal.

The rules in the rulebase of FIG. 1 are therefore dynamically adapted to accommodate changes in the sensor signal. As the noise components of the signal predominate, the rulebase is redefined to accommodate the additional noise by widening the range of what is considered valid. If the signal has less noise, the rulebase is redefined to accommodate the reduced noise levels by narrowing the range of what is valid.

A statistical analysis was devised to automatically adapt the rules in the rulebase. This analysis determines the degree of scatter in the raw signal data as compared to the estimated sensor data. The output of this statistical analysis was then used to modify the rules in the rulebase dynamically, as sensor signal data values were received (in this case received from a data file previously generated).

Figure 2:
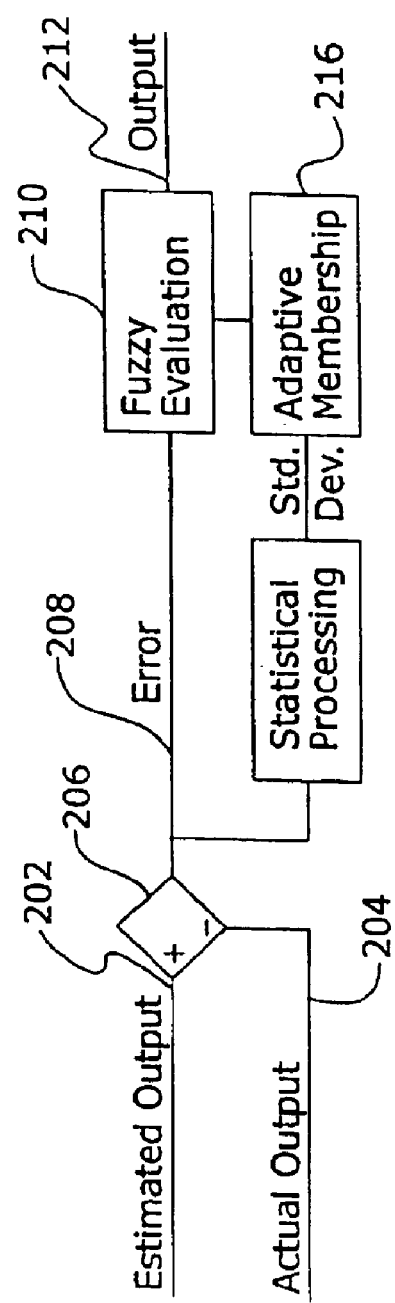
FIG. 2 illustrates the automatic adaptation circuit of the rulebase of FIG. 1 showing how it accommodates changes in the signal level by changing the points of inflection of the membership functions based upon the statistical scatter of the difference between a raw sensor signal and an estimated value of that signal.

FIG. 2 illustrates the process and circuit for automatically adapting the rules in the rulebase. An estimated signal value ("Estimated Output" in FIG. 2) is provided on line 202. The raw signal value ("Actual Output" in FIG. 2) is provided on line 204. These two values are differenced in block 206 to provide a difference (or error) signal on line 208. This error signal is then evaluated in block 210 to determine whether the raw signal is good or bad. The output of block 210 is a validity signal on line 212 that is indicative of whether the signal on line 204 is good or bad, and therefore whether it should be ignored or used in further processing.

As each new error signal is generated, it is also processed in block 214 to generate the standard deviation of the error signal. The greater the scatter in the error signal, the greater the value of the standard deviation. In block 216, this standard deviation is applied to the membership functions of the rulebase (FIG. 1) to adapt the membership functions of the rulebase in accordance with the degree of scatter in the error signal. It is this adaptation of the rulebase that lets the system accommodate sensor signals that have greater or lesser degrees of scatter as time goes by.

Figure 3:
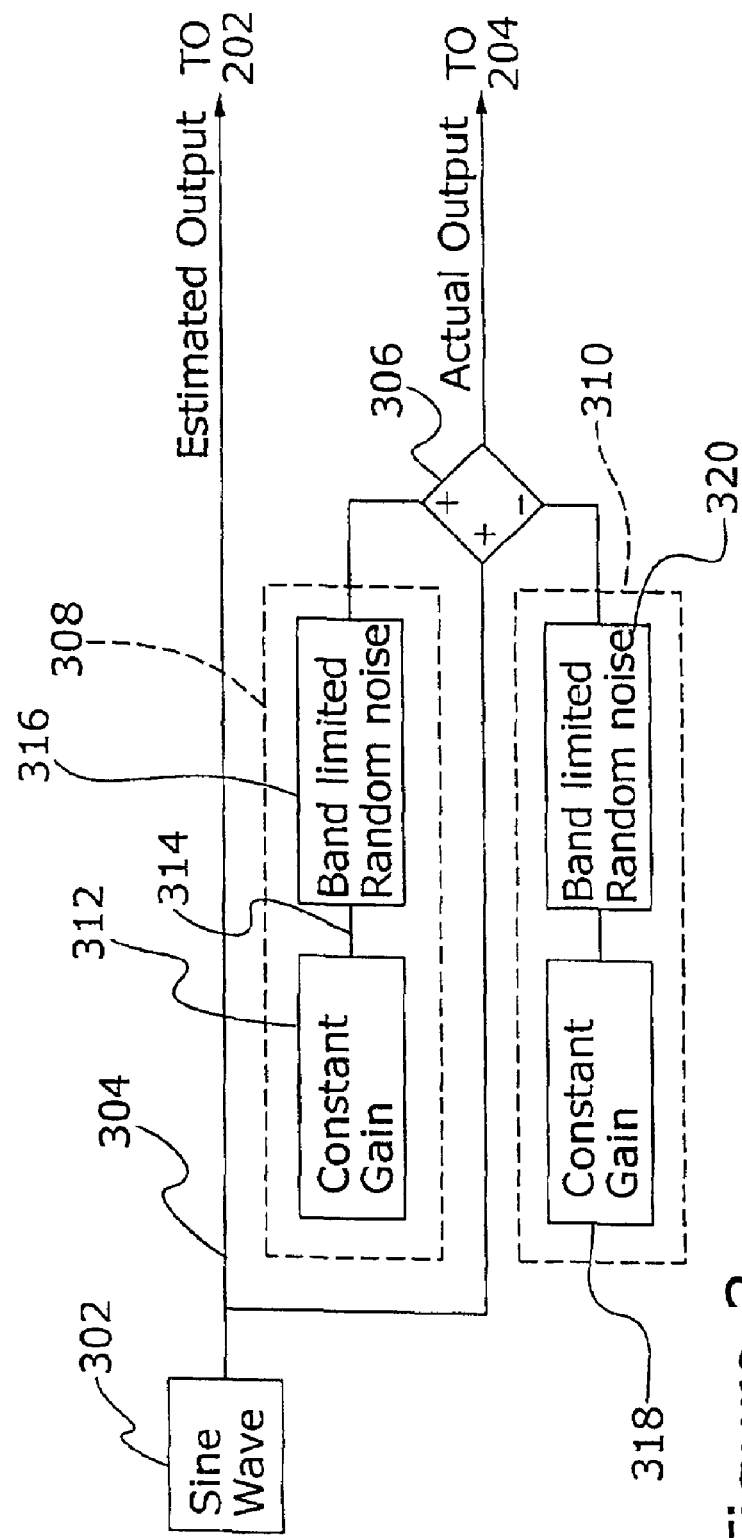
FIG. 3 illustrates the simulator circuit that generates an estimated sensor signal (the "estimated output") and a raw sensor signal (the "actual output")

The circuit by which the estimated output and actual output signals were produced is illustrated in FIG. 3. A sine wave generator circuit 302 produced a sine wave on signal line 304. The sine wave signal on line 304 was then applied to line 202 of FIG. 2 as the estimated output signal.

The circuit that manufactures the actual output signal (the raw sensor signal) is also shown in FIG. 3. The sine wave signal from generator 302 is applied to summation block 306 where it is combined with two simulated noise components generated by positive noise circuit 308 and negative noise circuit 310. It is this combined signal was used as the actual output signal (the raw sensor signal).

Positive noise circuit 308 includes a gain signal circuit 312 that generated a signal on line 314 that is indicative of a simulated amplitude of positive noise. This gain signal was, in turn, transmitted to a random noise source 316 which generated a normalized random noise component. The output of source 316 is a positive random noise component that is supplied to summation block 306 which adds it to the sine wave signal.

Negative noise circuit 310 includes a similar gain signal circuit 318 that is similarly coupled to a random noise circuit 320 and thence similarly transmitted to summation block 306 where it is subtracted from the sine wave signal. The output of the summation block is then applied to the actual output line 204 of FIG. 2.

The circuit of FIG. 3 illustrates a typical sensor signal that has a nominal sensor signal and a noise component. In this circuit, the sensor that is simulated provides a time varying signal, for convenience modeled here as a pure sine wave. For purposes of validating the method, however, this simulated signal is sufficient.

The nominal output from the simulated sensor was a 100-unit sine wave. An arbitrary, unitless scale was chosen for the simulated sensor signal. Incorporating positive and negative noise simulated a 'noisy' sensor. The noise terms were seeded independently each iteration of the simulation.

The noise terms had a range of −25.0 to +25.0 ($\mu$=−0.646, $\sigma$=0.289). The additive noise gave the simulated sensor a slight negative bias, simulating an offset configuration or installation. Modeling an input signal was not the goal of the project; therefore an ideal estimator was assumed.

The estimator was implemented as the 'clean' or nominal sine wave. As shown in FIG. 2, the difference (or error) between the actual and estimated sensor output, was used as the input to the validation module.

In this manner two input signals are generated, (1) a sine wave estimated sensor output signal and (2) a sine wave+ positive noise+negative noise actual sensor output signal. The difference between the two signals is therefore a positive going and negative going random noise component. Hence, referring back to FIG. 2, the error signal (i.e. the difference between the estimated output and the actual output) is a random noise component having both negative going and positive going components.

To test the fuzzy logic validation method, both the estimated output (the sine wave signal) and the actual output (the sine wave-plus-noise signal) were produced to create several runs of several hundred pairs of values each (i.e. the estimated sensor value and the corresponding raw sensor value). These runs of several hundred pairs of values were digitally stored in computer files.

Figure 5:
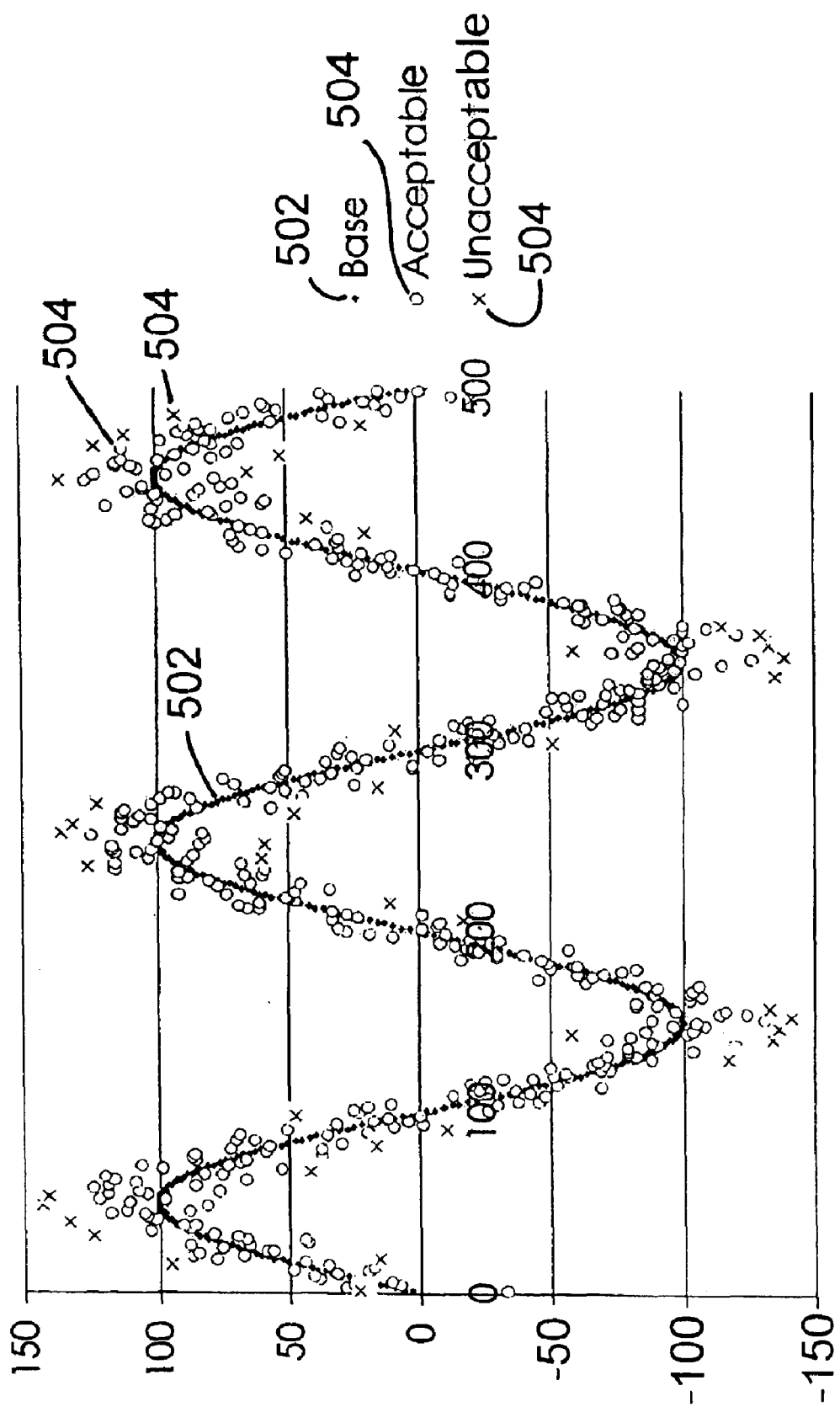
FIG. 5 is a plot of a data set of sensor values processed using the wide input membership function of FIG. 4A showing all the individual datapoints comprising the sensor values. These datapoints are identified as acceptable ("o") or unacceptable ("x")
Figure 6:
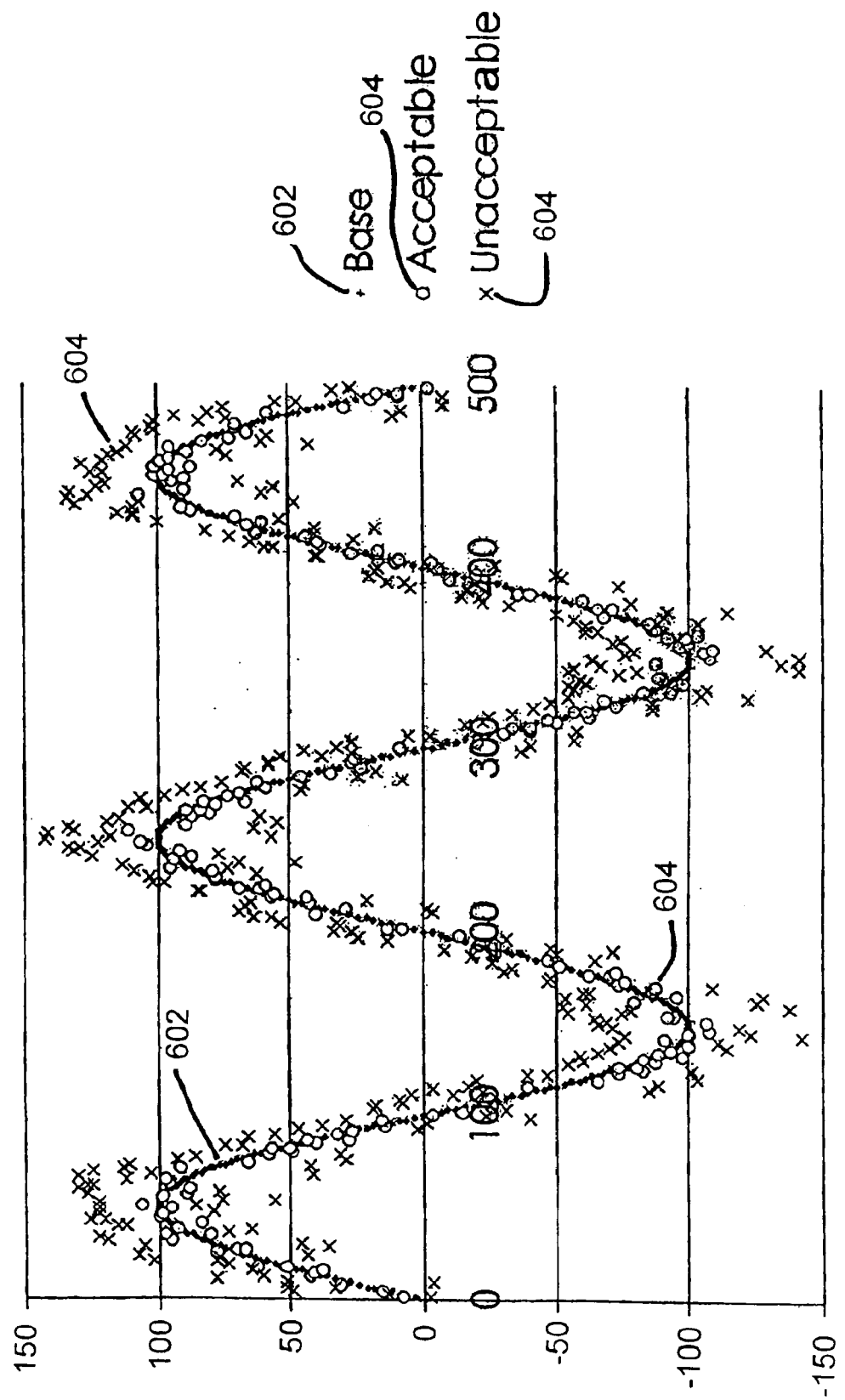
FIG. 6 is a plot of a data set of sensor values processed using the narrow input membership function of FIG. 4B showing all the individual datapoints comprising the sensor values. These datapoints are identified as acceptable ("o") or unacceptable ("x")

Graphical plots of two of these simulation runs are shown in FIGS. 5 and 6. The sine wave signal (the estimated output) is shown as sine waves 502 and 602 in FIGS. 5 and 6, respectively. The sine wave signal can be considered a pure or perfect estimated sensor value.

The sine wave-plus-noise signal is shown as the data points 504 and 604 in FIGS. 5 and 6, respectively. Note that the data points in both FIGS. 5 and 6 are shown both as dots and as small crosses. The dots represent the data points that the circuit of FIGS. 1 and 2 evaluated as acceptable or valid, and the crosses represent data points determined as unacceptable or invalid. The way in which this validation was performed will be discussed in more detail below. For the moment it is enough to know that all the data points in both FIGS. 5 and 6, regardless of their shape, represent a sine wave-plus-noise value, an "actual output" (FIG. 2) value and graphically illustrate just two of the simulated sensor data sets (estimated and raw sensor values) created using the circuit of FIG. 3.

Referring back to FIG. 2, once the standard deviation (more generally the value indicative of the degree of scatter in the differences between estimated sensor values and actual sensor values) is calculated in the statistical processing circuit 214, it is then used to adapt the rules in the fuzzy logic rulebase 104 used to validate each sensor value. The rules in the rulebase are graphically shown in FIGS. 4A and 4B. The circuit that performs the adaptation is item 216 in FIG. 2.

Referring now to FIGS. 4A and 4B, two membership functions for evaluating the validity of the sensor data are illustrated. These FIGURES represent rules in the rulebase of FIG. 1. In both FIGURES, the membership function includes three trapezoidal domains that are symmetric about a value of zero error. "Error" (represented as "$\mu$" in FIGS. 4A and 4B) refers to the difference between the raw sensor signal and the estimated sensor signal that is provided on signal line 208 of FIG. 2.

There are three domains in each of these membership functions. The first is a central acceptable domain 402, 404 that is symmetric about an error value of zero. An error value of zero is achieved whenever the difference between the estimated output of the sensor is equal to the actual output of the sensor. Clearly, when the actual value and the estimated value are the same we have the canonical case wherein a sensor signal would be considered acceptable.

On either side of the central acceptable domains, are symmetrical unacceptable domains, 406, 408, 410, 412. Each of these domains is a mirror image of the other with respect to the central error "$\mu$" value of zero. As the error increases, eventually these regions are reached and the corresponding raw sensor value (actual output) will be evaluated as unacceptable.

Note that the points of inflection of both the acceptable domains and the unacceptable domains projected onto the x-axis are identified not with constant error values, but by a constant value times sigma ($\sigma$). Sigma represents the standard deviation of the error. More generally it represents a value indicative of the degree of scatter in the sequentially calculated error values.

In FIG. 4A, the values are −2$\sigma$, −1$\sigma$, 0, 1 $\sigma$, and 2 $\sigma$. In FIG. 4B the values are −1 $\sigma$, −½$\sigma$, 0, ½$\sigma$, and 1 $\sigma$. Generally speaking these can be thought of as the more general case of [−2$C_1\sigma$, −$C_1\sigma$, $C_1\sigma$, 2$C_1\sigma$] where $C_1$=1 in FIG. 4A, and $C_1$=½ in FIG. 4B.

As we explained above, every time a new sensor value is retrieved, the standard deviation of the error is recalculated. The values for the standard deviation are substituted into the membership functions and the x-axis values of the points of inflection for each of the domains are recalculated accordingly. This occurs in block 216 of FIG. 2.

The result is that the membership functions adapt to respond to changes in the degree of scatter in the error.

Comparing FIGS. 4A and 4B, one can see that different sensors may be provided with different membership functions. FIG. 4A illustrates a sensor with a broad degree of acceptability, as indicated by the wide range of its acceptable domain from −2$\sigma$ to 2$\sigma$. The sensor of FIG. 4B has a narrower acceptable domain of −1$\sigma$ to 1$\sigma$. We can therefore expect many more sensor values to be rejected using the membership function of FIG. 4B than for the function of FIG. 4A.

The generic fuzzy quality analysis module used the adaptively tuned membership functions to evaluate the sensor data in block 210. Again, the sensor data was the data previously developed and stored in a file. The results of this simulation are shown in FIGS. 5 and 6. The output membership functions were iteratively tuned to provide a positive output for acceptable data (acceptable) and a negative output for unacceptable data (unacceptable). The two different width adaptive membership functions (FIGS. 4A and 4B) were simulated. The sensor variability, represented by the standard deviation of the error ($\sigma$), indicated the relative distribution of the data. The smaller the variation, the more apparent a single outlier becomes; conversely, increasing the variability makes it more difficult to detect outliers. For both systems, both fuzzy logic membership functions, the standard deviation of the error was updated at each iteration through the loop and used to continually adjust the width of the membership functions. Four points on the x-axis (FIGS. 4A and 4B) defined the acceptable or acceptable sensor region: $[-2C_1\sigma, -C_1\sigma, C_1\sigma, 2C_1\sigma]$. $C_1$ was a width parameter that was used to vary the zone of acceptance.

For the first case, shown in FIG. 5 (and using the membership function of FIG. 4A having a wide acceptability), $C_1$ was set to 1, creating a zone of acceptance that was described by $[-2\sigma, -\sigma, \sigma, 2\sigma]$.

For the second case, shown in FIG. 6 (and using the membership function of FIG. 4B having a narrow acceptability), $C_1$ was decreased to ½, forming a zone of acceptance that was described by $[-\sigma, -½\sigma, ½\sigma, \sigma]$. Outside the first parameter, the fitness value was zero.

The fitness value increased linearly from the first parameter $(-2C_1\sigma)$ to the second parameter $(-C_1\sigma)$. From the second parameter to the third parameter $(C_1\sigma)$, the fitness value remained constant at a maximum fitness of 1. The fitness value decreased linearly from the third parameter to the fourth parameter $(2C_1\sigma)$. The unacceptable (unacceptable) regions were defined to overlap the outer two parameters as shown in FIGS. 4A and 4B. They were also linear between $-2C_1\sigma$ and $-C_1\sigma$ as well as between $C_1\sigma$ and $2C_1\sigma$ but with the identical (but negative) slope.

Referring now to FIGS. 5 and 6, shrinking the zone of acceptance increased the number of data points rejected by the system as indicated by the increased number of signal values marked with "x". The zones of acceptance were used both for adaptively tuning the membership functions and to evaluate the performance of the algorithm. The simulation was repeated five times for both the narrow and wide adaptive classes. Each simulation was 499 iterations, one iteration for each of the data points shown in FIGS. 5 and 6.

Representative results for the wide adaptive class are shown in FIG. 5. Representative results for one of the narrow adaptive class simulations are shown in FIG. 6. The points indicated with an "x" were considered unacceptable by the fuzzy quality analysis system.

The progressive adaptation of the system to the changing degree of scatter in the data can be seen in both FIG. 5 and FIG. 6. In both cases, the standard deviation of the error was initially low, creating a narrow adaptive acceptance region. This narrow region led to an increased rejection rate early in the simulation. This can be seen by the high rejection rate on the left side of the graphs of FIGS. 5 and 6.

As the simulation progressed, the adaptive regions reached a stable width. In FIGS. 5 and 6, the system rejected more points early on; as the system built a history of the prior results (i.e. as it repetitively modified the membership functions with each iteration), the rejection rate decreased, and only significant outliers were discarded.

EVALUATION

The improvement this fuzzy quality analysis method offers can be readily seen by comparing the performance of the fuzzy adaptive quality analysis module to a crisp manual evaluation scheme—by manually comparing the absolute value of the sensor error to the zone of acceptance defined in the membership functions as shown in FIGS. 7 and 8.

FIG. 7 compares (a) the results that would have been achieved using two crisp zones of acceptance of $1C_1\sigma$ and $2C_1\sigma$, with (b) the results achieved by using the fuzzy quality analysis method described above.

In the first rows of FIG. 7, the number of datapoints accepted using the wide criteria of FIG. 4A are compared with these two crisp zones (where $C_1=1$).

In the lower rows of FIG. 7, the number of datapoints accepted using the narrow criteria of FIG. 4B are compared with the same two crisp zones (where $C_1=0.5$).

The effect was magnified as the width of the acceptance zone decreased. The crisp manual evaluation scheme tended to be overly conservative for narrow acceptance regions ($C_1\sigma$), rating potentially useable readings as unacceptable. As the width of the acceptance region increased ($2C_1\sigma$), the crisp manual evaluation scheme became overly permissive and rated questionable results as acceptable. In contrast, with the fuzzy system, results that fell between regions were rated accordingly.

FIG. 7 shows that the overall number of data point rejections and acceptances are substantially the same for both the manual and the fuzzy logic system. Nonetheless, the results do not tell us the degree to which each individual datapoint was treated in the same manner by both the manual classification method and the fuzzy logic quality analysis method.

FIG. 8 compares the fuzzy quality analysis method with a manual classification method on a datapoint-by-datapoint basis by classifying the fuzzy quality results as TRUE or FALSE depending on whether the manual and fuzzy evaluation schemes agreed. A TRUE result indicates that the manual and fuzzy evaluation schemes classified a data point the same way. A FALSE result indicates disagreement between the two evaluation methodologies. Classification of TRUE or FALSE, however, was unaffected by the relative quality of the individual sensor readings; classification depended only on the agreement between the two methods.

A comparison between the two evaluation schemes indicates average agreement between 82.98% and 87.05%. The highest agreement occurred with the narrowest (Narrow $C_1\sigma$) classes, which tended to reject both evaluation schemes The simulation shows that a fuzzy evaluation scheme can be used to validate sensor output. Adaptive membership functions allowed the definition of acceptability to be related to the current performance of the system.

The method that was simulated above indicates that a fuzzy quality evaluation method is workable and provides results that are comparable to a manual classification method.

Figure 9:
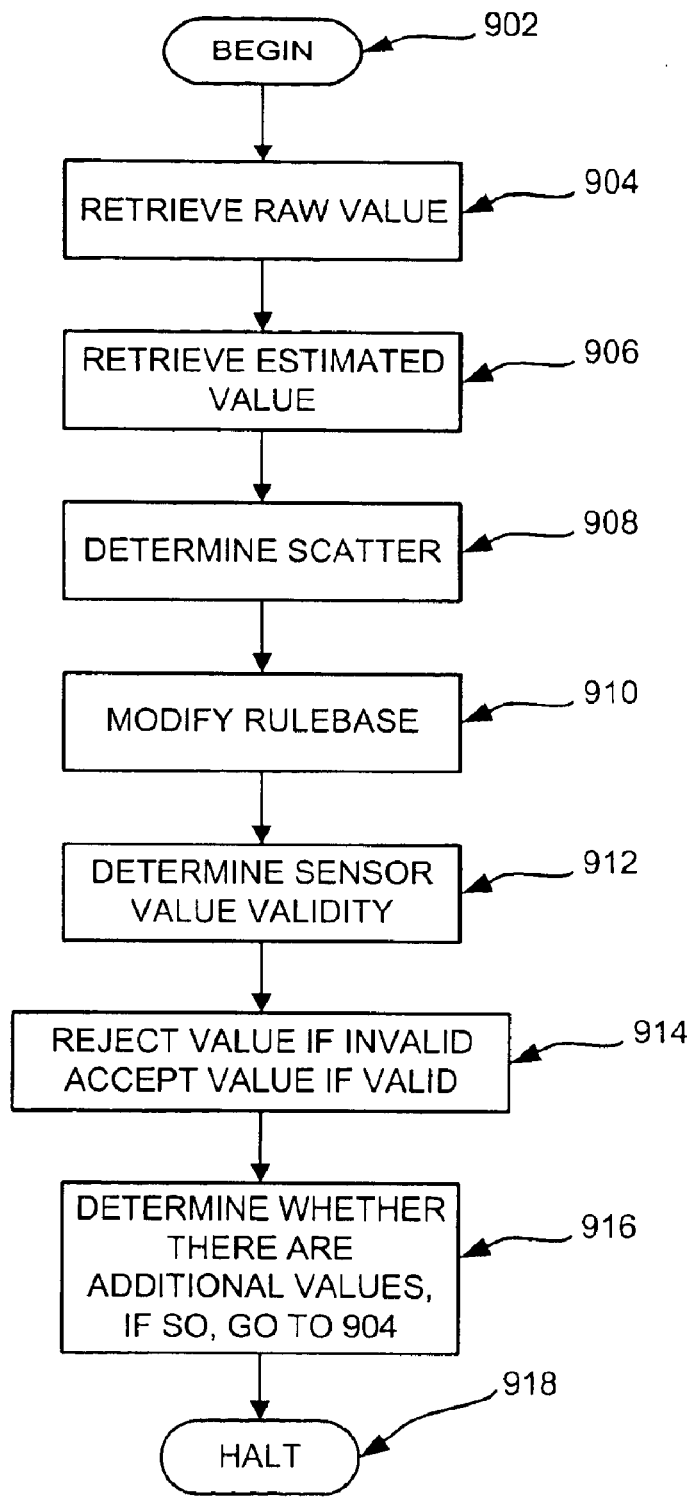
FIG. 9 is a flowchart illustrating the fuzzy logic sensor signal validity determination method.

Referring now to FIG. 9 you can see a flow chart of the steps performed by the fuzzy logic sensor data validation method. In block 902, the process begins. The first step is shown in block 904 in which a raw sensor value is retrieved from the sensor. Again, this can be any sensor. In block 906, an estimated sensor value is retrieved. In block 908, the method determines the degree of scatter between the raw and the estimated sensor values. In block 910, the fuzzy logic rulebase is modified or adapted based upon the degree of scatter indicated in block 908. In block 912, the modified rulebase is used to evaluate the current sensor value to determine its validity or invalidity. In block 914, the sensor value is rejected if invalid and accepted if valid. In block 916, the system determines whether or not there are additional sensor values. If so, it begins the process again at block 904 where it retrieves a second sequential (in time) sensor value and repeats the process. If there are no more sensor values, the process is halted in block 918. In the preferred embodiment, this algorithm will be implemented on a digital microcomputer or microcontroller. The sensor signal, while it may be received from previously gathered data, will preferably be transmitted to the computer in real time as the sensor responds to additions in the changing conditions in the sensed environment. In the preferred embodiment, when the sensor value is rejected it will merely be ignored in subsequent processing steps. Subsequent processing steps may include a wide range of automatic activity, typically executed by an appropriately programmed microprocessor or microcontroller. An example of such a process is trajectory planning algorithm that determines what direction an agricultural vehicle should turn in order to stay on a planned path. A typical sensor that might be employed could be a camera for a vehicle navigation system, a heading sensor for such a vehicle, a steering angle sensor for such a vehicle, or a GPS receiver for such a vehicle. It should be understood, however, that any particular sensor or particular application is not deemed to be within the scope of the attached claims as filed.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A method for determining the validity of a sensor signal of a sensor including the steps of:

providing a sensor signal from a sensor;
   providing an estimated sensor signal of the sensor;
   determining the difference between the sensor signal and the estimated sensor signal;
   calculating a standard deviation of the difference;
   scaling the points of inflection of a fuzzy logic membership function proportional to the standard deviation; and
   processing the sensor signal using the fuzzy logic membership function to determine whether the sensor signal is valid or not.

2. The method of claim 1, wherein the step of processing occurs before the step of scaling.

3. The method of claim 1, wherein the step of scaling occurs before the step of processing.

4. The method of claim 1, wherein the fuzzy logic membership function has at least two domains, including at least one domain that evaluates a sensor signal as acceptable, and at least one domain that evaluates a sensor signal as unacceptable.

5. The method of claim 4, wherein the step of scaling includes the step of multiplying a plurality of points of inflection of the fuzzy logic membership function by the standard deviation.

6. A method for determining the quality of a sensor signal of a sensor in a fuzzy logic controller including the steps of:

providing a first cumulative scatter value indicative of a cumulative degree of difference between a plurality of sensor signal values of the sensor and estimated sensor signal values of the sensor corresponding to each of the sensor signal values;
   providing a fuzzy logic membership function in which the x-axis values of the points of inflection of a plurality of fuzzy logic domains are derived from the first cumulative scatter value;
   retrieving a further sensor signal value of the sensor;
   comparing the further sensor signal value with a further estimated sensor signal value of the sensor;
   calculating a further scatter value indicative of the individual degree of difference between the further sensor signal value and the further estimated sensor signal value;
   combining the further scatter value with the first cumulative scatter value to provide a second cumulative scatter value indicative of the cumulative degree of difference and the individual degree of difference in combination; and
   amending the fuzzy logic membership function such that the x-axis values of the points of inflection of the plurality of fuzzy logic domains are derived from the second cumulative scatter value.

7. The method of claim 6, wherein the step of providing a first cumulative value includes the steps of:

a. calculating a first difference between a first of the plurality of sensor signal values and a first of the estimated sensor signal values;
   b. calculating a second difference between a second of the plurality of sensor signal values and a second of the estimated sensor signal values; and
   c. calculating the first cumulative scatter value from at least the [foregoing] first and second differences.

8. The method of claim 7, wherein the first cumulative scatter value is a function of the standard deviation of the first and second differences.

9. A method of individually determining whether a plurality of sequential sensor values of a sensor are valid comprising the steps of:

a. reading a sensor value of the sensor;
   b. determining a degree of difference between the sensor value and an estimated sensor value of the sensor;
   c. revising the x-axis values of a fuzzy logic membership function that responds to the degree of difference as an input and produces a signal indicative of the validity of the sensor value as an output;
   d. determining whether the sensor value is valid;
   e. repeating steps a through d for each of the plurality of sequential sensor values; and
   f. calculating a value indicative of a collective degree of scatter of the individual degrees of difference calculated in step b.

10. The method of claim 9, wherein the step of calculating is performed after each step of determining a degree of difference, and wherein the value indicative of the collective degree of scatter incorporates all of the previous individual degrees of difference.

11. The method of claim 10, wherein the value indicative of the collective degree of scatter is a standard deviation of degrees of difference calculated prior in step b.

12. The method of claim 11, wherein x-axis values of the membership function are themselves functions of the standard deviation.

13. The method of claim 12, further comprising the step of calculating a plurality of the x-axis values every time the step of calculating a value indicative of the degree of scatter occurs.

14. The method of claim 13, wherein each of the x-axis values of the points of inflection is associated with a value that is a function of the collective degree of scatter.

* * * * *